(12) United States Patent  
Barrass

(10) Patent No.: US 9,419,901 B2  
(45) Date of Patent: Aug. 16, 2016

(54) NETWORK TRAFFIC PREEMPTION USING INTERMITTENT ENCAPSULATION

(71) Applicant: Cisco Technology, Inc., San Jose, CA (US)

(72) Inventor: Hugh Barrass, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 117 days.

(21) Appl. No.: 14/074,037

(22) Filed: Nov. 7, 2013

(65) Prior Publication Data

US 2015/0124610 A1     May 7, 2015

(51) Int. Cl.
*H04L 12/801*     (2013.01)
*H04L 12/851*     (2013.01)

(52) U.S. Cl.
CPC .............. *H04L 47/12* (2013.01); *H04L 47/245* (2013.01)

(58) Field of Classification Search
None
See application file for complete search history.

(56) References Cited

U.S. PATENT DOCUMENTS

| | | | |
|---|---|---|---|
| 2002/0041595 A1 | 4/2002 | Delvaux | |
| 2006/0109864 A1* | 5/2006 | Oksman | 370/474 |
| 2011/0261814 A1 | 10/2011 | Matthews et al. | |
| 2013/0016724 A1 | 1/2013 | Thaler | |
| 2014/0245114 A1* | 8/2014 | Thaler et al. | 714/807 |

OTHER PUBLICATIONS

International Search Report and Written Opinion, dated Jan. 22, 2015, received in connection with International Application No. PCT/US2014/064619.

* cited by examiner

*Primary Examiner* — Awet Haile
*Assistant Examiner* — Kent Krueger
(74) *Attorney, Agent, or Firm* — Meunier Carlin & Curfman LLC

(57) ABSTRACT

An example method for intermittent encapsulation of preemptable network traffic at a network node can include receiving a frame at the network node and determining if the frame is a preemptable frame. A preemptable frame is a frame that can be preempted, suspended, interrupted, etc. after transmission begins in order to transmit a preemptive frame. If the frame is a preemptable frame, the method can include determining if the preemptable frame satisfies a selective encapsulation rule. If the preemptable frame does not satisfy the selective encapsulation rule, the method can include transmitting the preemptable frame from the network node without encapsulation. Alternatively, if the preemptable frame satisfies the selective encapsulation rule, the method can include encapsulating and transmitting the preemptable frame from the network node. The preemptable frame can be encapsulated with a preemption header and/or a preemption trailer.

14 Claims, 4 Drawing Sheets

NETWORK TRAFFIC PREEMPTION USING INTERMITTENT ENCAPSULATION

BACKGROUND

The variable size of network packets such as Ethernet packets, for example, can cause unacceptable variations of packet delay for time-critical packets that caught behind long, lower-priority packets transmitted just prior to transmission of the time-critical packets. For some real-time control networks, transmission of time-critical packets is scheduled, and to guarantee transmission at the scheduled time, non-critical packets are prevented from occupying the link during the scheduled time. Interface standards, such as Ethernet, do not support parallel transmission of multiple frames on a single link. Therefore, the transmission scheduling mechanism must guarantee that any non-critical packet transmission is completed in advance of the time when a time-critical packet is scheduled.

In addition to transmission scheduling, preemption may also be used to alleviate the unacceptable variations of packet delay. For example, long, lower-priority packets can be interrupted in order to transmit the time-critical packets. To avoid waste of bandwidth, transmission of the long, lower-priority packets is resumed after transmitting the time-critical packets. A number of methods including low-level coding (e.g., at the line-code level), alternating cyclic redundancy check ("CRC") schemes and encapsulation have been used to manage preemption. Encapsulation is a popular method because it is less complicated than low-level coding and alternating CRC schemes, but encapsulation increases the bandwidth of the network traffic by adding overhead. Further, every frame from one or more network traffic flows that can be preempted must be encapsulated, which adds to the overhead.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
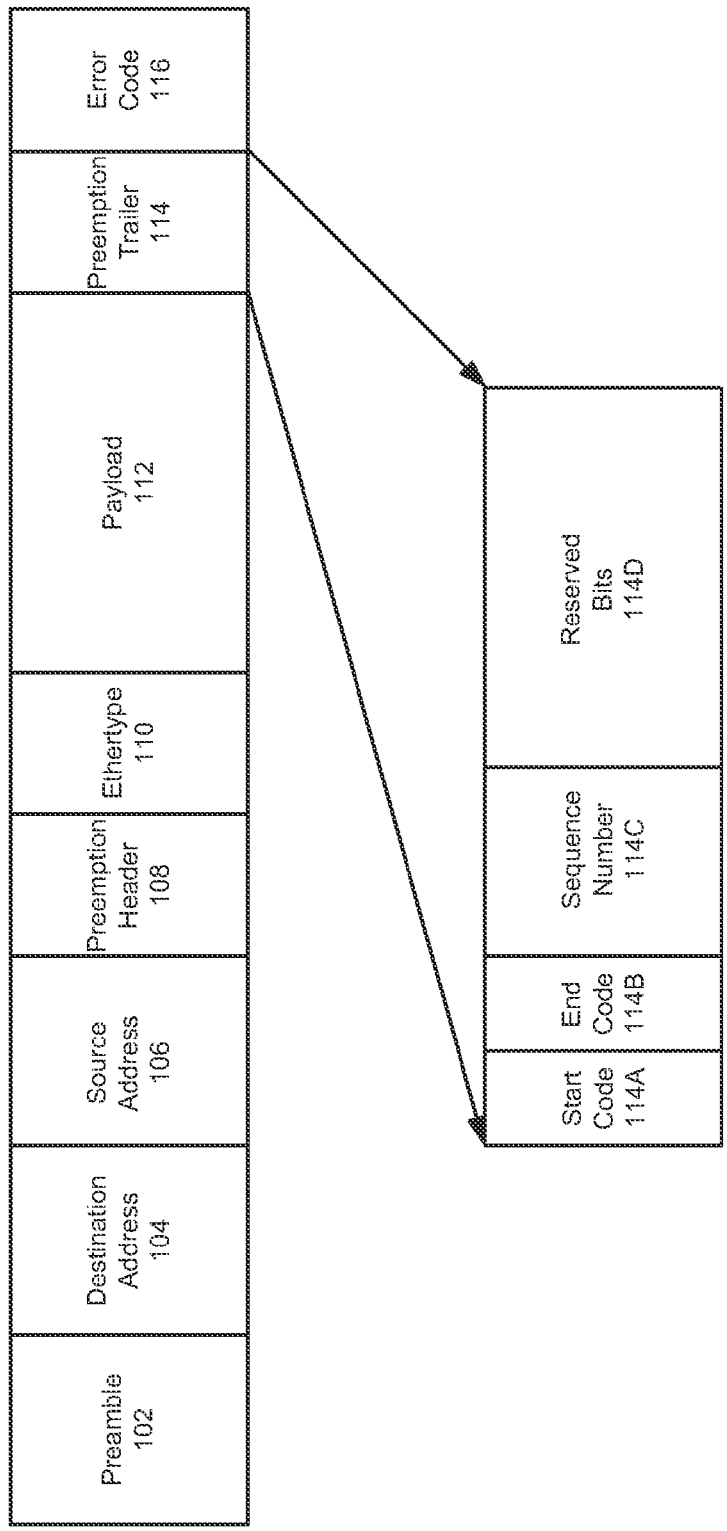
FIG. 1 is a block diagram illustrating an example encapsulated frame.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. While implementations will be described for intermittent encapsulation of Ethernet traffic, it will become evident to those skilled in the art that the implementations are not limited thereto, but are applicable for intermittent encapsulation of network traffic that complies with other protocols.

Methods and devices for selectively or intermittently encapsulating network traffic are provided herein. The selective encapsulation mechanisms can reduce the aggregate overhead of encapsulation. For example, instead of encapsulating every frame from a flow or a type of flow (e.g., a preemptable flow), only frames from the preemptable flow that satisfy a selective encapsulation rule are encapsulated. Frames from the preemptable flow that do not satisfy the selective encapsulation rule are not encapsulated. Thus, less than every frame from the preemptable flow is encapsulated according to the selective encapsulation mechanisms.

Optionally, the selective encapsulation methods can be applied to traffic complying with Ethernet standards. As discussed above, in related art, every frame from a flow or a type of flow (e.g., a preemptable flow) is encapsulated. It should be understood that a flow is defined as packets sharing a unique combination of parameters. Packets that match a particular set of defined parameters are considered to belong to the same flow. Parameters can be one or more packet-header fields including, but not limited to, source and destination IP address, port and session number, source and destination MAC address, IP protocol and type of IP service.

A preemptable frame can be a frame that is capable of being preempted (or interrupted, suspended, etc.) after transmission begins, for example, in order to transmit higher priority traffic such as preemptive traffic (discussed below). Optionally, the higher priority traffic can be time-critical traffic. Alternatively or additionally, the preemptive traffic can optionally be transmitted during a scheduled transmission window, e.g., a scheduled time period reserved for the exclusive or preferential transmission of the preemptive traffic. In addition, preemptable traffic includes preemptable frames. Transmission of preemptable frames can optionally be precluded or de-prioritized during the scheduled time period and/or to allow transmission of higher priority traffic. After the scheduled time period ends and/or after transmitting the higher priority traffic, transmission of the preemptable frames can be resumed.

A preemptive frame is a frame that can cause a preemptable frame to be preempted (or suspended, interrupted, etc.) after transmission begins. A preemptive frame can optionally be a non-preemptable frame. A non-preemptable frame is a frame that cannot be preempted (or suspended, interrupted, etc.) once transmission begins. A preemptive frame can optionally be transmitted during the predetermined time period and/or between fragments of a preemptable frame. In addition, preemptive traffic includes preemptive frames. Optionally, preemptive traffic can be higher priority traffic as compared to preemptable traffic.

A preempted frame can be a preemptable frame that has been preempted (or interrupted, suspended, etc.) after transmission of the preemptable frame begins. Optionally, the preempted frame can be split into a plurality of fragments in order to allow transmission of one or more preemptive frames, for example, between two fragments of the preempted frame. Optionally, a preemptable frame can be preempted by a specific preemptive frame or alternatively can be preempted in order to guarantee that scheduled transmission of higher priority traffic is clear and available.

A fragment can be a single, complete portion of a preempted frame. A fragment can optionally be transmitted from start to finish without interruption. As discussed above, a preempted frame can optionally be split into a plurality of fragments including a first fragment and a last fragment. Optionally, the preempted frame can include one or more intermediate fragments between the first and last fragments. Alternatively, the preempted frame can include only the first and last fragments and no intermediate frame fragments. Additionally, each fragment can conform to all of the rules for frame transmission. For example, for Ethernet frames, each fragment can conform to the rules of Ethernet frame transmission. In this way, each fragment appears to the media access control ("MAC") sub-layer as a complete, legal frame. Alternatively, for Ethernet frames, each fragment can break the rules of Ethernet frame transmission. In this way, a solitary fragment would be seen as an illegal entity by a MAC sub-layer.

Referring now to FIG. 1, a block diagram of an example encapsulated frame 100 is shown. The example encapsulated frame 100 is an encapsulated Ethernet frame, for example. The example encapsulated frame 100 includes a preamble 102, a destination address 104 (e.g., a destination MAC address), a source address 106 (e.g., a source MAC address), a payload 112 and an error code 116 (e.g., a cyclic redundancy check ("CRC")). The example encapsulated frame 100 can also optionally include an Ethertype 110. The preamble 102, destination address 104, source address 106, Ethertype 110, payload 112 and error code 116 are well known in the art and are therefore not discussed in further detail below. As discussed above, the network traffic provided in the examples below complies with Ethernet standards. It should be understood that selective encapsulation should not be limited Ethernet traffic and can be extended to network traffic complying with other protocols, standard or proprietary.

As discussed above, network traffic can include preemptable frames (e.g., capable of being preempted, interrupted, suspended, etc. after transmission begins) and preemptive frames (e.g., capable of causing preemption, interruption, suspension, etc. after transmission begins and/or being non-preemptable). This disclosure contemplates that preemptable frames can be part of a flow or type of flow, which can be identified/classified by any means known in the art such as by inspection of one or more of the frame fields, for example. Optionally, preemptive frames are not encapsulated or altered in any manner before transmission. Additionally, preemptable frames are optionally encapsulated with a preemption header 108 and a preemption trailer 114 before transmission. The preemption header 108 can optionally occupy the EtherType field of the preemptable frame. The preemption header 108 can optionally be inserted as the first EtherType, for example. For example, in some implementations, the preemption header 108 can optionally be an outer VLAN tag and the Ethertype 110 can optionally be an inner VLAN tag. The preemption header 108 can be coded/numbered to identify an encapsulated, preemptable frame. Additionally, the preemption trailer 114 can optionally be inserted before the error code 116 as shown in FIG. 1. The preemption trailer 114 can optionally include a 2-byte code as provided below.

For example, the preemption trailer 114 can optionally include one or more of a start code 114A, an end code 11413, a sequence number 114 and reserved bits 114D. The start code 114A can be a 2-bit pattern with code "10" representing a start, first or beginning fragment of a preempted frame. The start code can optionally occupy the most-significant bits of the preemption trailer 114. Additionally, code "01" can represent a fragment subsequent to the start fragment of the preempted frame (e.g., a not start fragment). The remaining codes (e.g., 00 and 11) can be invalid. Alternatively or additionally, the end code 114B can be a 2-bit pattern with code "10" representing an end or last fragment of the preempted frame. The end code can optionally occupy the next most-significant bits of the preemption trailer 114. Additionally, code "01" can represent a fragment prior to the end fragment of the preempted frame (e.g., a not end fragment). The remaining codes (e.g., 00 and 11) can be invalid. Alternatively or additionally, the sequence number 114C can be a 4-bit pattern representing the order of a plurality of fragments of the preempted frame. The sequence number can optionally occupy the next most-significant bits of the preemption trailer 114. For example, the sequence number 114C of the start fragment can be set to an arbitrary code. The sequence number 114C of the start fragment can optionally be set to 0000 or any other value. The sequence number 114C of each fragment subsequent to the start fragment can have an incrementally higher value (e.g., increasing by +1). For example, when the sequence number 114C of the start fragment is 1010, the sequence numbers 114C of the third, fourth, etc. can be 1011, 1100, etc. Optionally, the sequence number 114C can roll over (e.g., from 1111 to 0000) when necessary. Optionally, this disclosure contemplates using any deterministic sequence for the sequence number and should therefore not be limited to incrementally increasing units. Alternatively or additionally, the reserved bits 114D can optionally be the 8 least-significant bits of the preemption trailer 114. It should be understood that the preemption header 108 and the preemption trailer 114 discussed above are provided only as examples and that the preemption header 108 and the preemption trailer 114 can have alternative configurations while implementing selective encapsulation mechanisms provided herein.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 2:
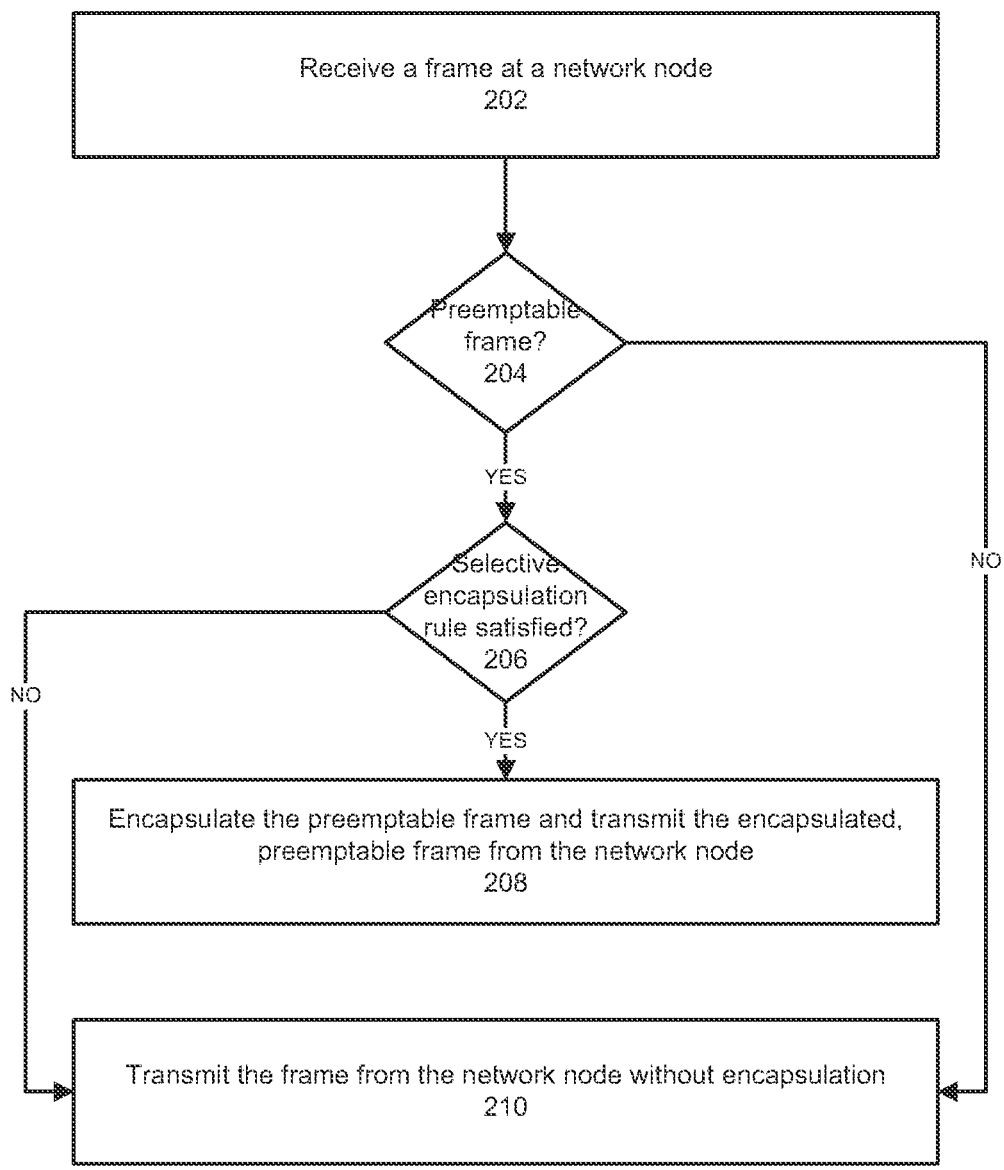
FIG. 2 is a flow diagram illustrating example operations for selective encapsulation and transmission of preemptable network traffic.

Referring now to FIG. 2, a flow diagram illustrating example operations 200 for intermittent encapsulation and transmission of preemptable network traffic is shown. Optionally, the selective encapsulation mechanisms provided herein can be negotiated by link partner network nodes, for example, using a link layer discovery protocol. Each link partner can be optionally be configured to encapsulate and transmit frames after the link partners have confirmed the mutual capability to support preemption. At 202, a frame is received at a network node. The network node can optionally be a packet-switching element such as a switch, router, gateway, etc. Then, at 204, the network node determines whether the frame is a preemptable frame (e.g., capable of being preempted, interrupted, suspended, etc. after transmission begins) or a preemptive frame (e.g., capable of causing preemption, interruption, suspension, etc. after transmission begins and/or being non-preemptable). As discussed above, this determination can be made by any known means including, but not limited to, inspecting and classifying the frame based on one or more of the frame fields. Preemptable frames can be part of a flow or type of flow and identified based on the frame fields, for example. As shown in FIG. 2, if the frame is not a preemptable frame (e.g., the frame is a preemptive frame), then the frame is transmitted from the network node without encapsulation at 210.

Next, at 206, the network node determines if the preemptable frame satisfies a selective encapsulation rule. If the preemptable frame does not satisfy the selective encapsulation rule, the preemptable frame is transmitted from the network node without encapsulation at 210. Alternatively, if the preemptable frame satisfies the selective encapsulation rule, the preemptable frame is encapsulated and transmitted from the network node at 208. By determining if the preemptable frame satisfies the selective encapsulation rule, less than all of the preemptable traffic is encapsulated, which reduces the aggregate overhead of encapsulation. In other words, although some frames are part of a preemptable flow, these frames will not be preempted, for example, based on frame size, transmission time or some other criteria. Preemptable frames that will not ultimately be preempted are therefore not encapsulated.

Optionally, the selective encapsulation rule can be a specified frame length. For example, the specified frame length can be a minimum frame length. If the preemptable frame is less than or equal to the specified frame length (e.g., the selective encapsulation rule is not satisfied), the preemptable frame is transmitted from the network node without encapsulation. If the preemptable frame is greater than the specified frame length (e.g., the selective encapsulation rule is satisfied), the preemptable frame is encapsulated before transmission from the network node. For example, the frame length can optionally be 128 bytes. This disclosure contemplates that the frame length can be more or less than 128 bytes. Additionally, in a network that supports jumbo frames such as frames having payloads greater than 1500 bytes, for example, selective encapsulation can be used to ensure network-wide jitter delay is not impacted by transmission of the jumbo frames. For example, the jumbo frames could satisfy the selective encapsulation rule and could be encapsulated and ready for preemption, if needed. The encapsulation overhead is also insignificant due to the size of the jumbo frames.

Alternatively or additionally, the selective encapsulation rule can be a scheduled transmission time window. Optionally, the length of the schedule transmission window can be extended by and include a guard band around the schedule transmission window. If the preemptable frame is transmitted outside of the scheduled transmission time window (e.g., the selective encapsulation rule is not satisfied), the preemptable frame is transmitted from the network node without encapsulation. If the preemptable frame is transmitted within the scheduled transmission time window (e.g., the selective encapsulation rule is satisfied), the preemptable frame is encapsulated before transmission from the network node. For example, the scheduled transmission time window can be a period of time during which time-critical network traffic is scheduled for transmission. During this time period, preemptable traffic that satisfies the selective encapsulation rule can be preempted, interrupted, suspended, etc. to allow the time-critical traffic to flow. This disclosure contemplates that the scheduled transmission time window can be other periods of time.

The preemptable frame can be encapsulated with a preemption header and/or a preemption trailer, for example, as discussed above with regard to FIG. 1. Optionally, the preemptable frame, if preempted, (e.g., the preempted frame) can be split into a plurality of fragments, and each of the fragments can be encapsulated with a preemption header and/or a preemption trailer. The preemption header can optionally be attached at or near the beginning of the preemptable frame or a fragment of the preempted frame. The preemption trailer can optionally be attached at or near the end of the preemptable frame or the fragment of a preempted frame. Additionally, the preemption header can optionally include an identifying code (e.g., Ethertype) that defines the nature of the preemptable frame or the fragment of the preempted frame and that implies the presence of a corresponding preemption trailer. In addition, the preemption trailer can include at least one of a start code, an end code and a sequence number. A start code can indicate whether a fragment is a first fragment of a preempted frame (e.g., code "10"). An end code can indicate whether a fragment is a last fragment of a preempted frame (e.g., code "10"). A sequence number can identify the order of fragments of a preempted frame. Optionally, the preemption trailer of a first frame fragment of the preempted frame can include the start code representing a first frame and the sequence number. Additionally, the preemption trailer of a last frame fragment of the preempted frame can optionally include the end code representing a last frame and the sequence number. Further, the preemption trailer of an intermediate frame fragment of the preempted frame can optionally include the sequence number, and optionally neither the start code nor the end code. If the preemptable frame has not yet been split into fragments, the preemptable frame can be encapsulated with the preemption header and the preemption trailer. The preemption trailer can include the start code indicating the first fragment (e.g., code "10"), the end code indicating the last fragment (e.g., "10") and the sequence number set to an arbitrary value.

If the preemptable frame is split into fragments, each of the fragments can be encapsulated with the preemption header and the preemption trailer. One or more preemptive frames can be transmitted between any two fragments. The preemption trailer for the first fragment can include the start code indicating the first fragment (e.g., code "10"), the end code indicating a not end fragment (e.g., "01") and the sequence number set to an arbitrary value. The preemption trailer for each intermediate fragment can include the start code indicating a not start fragment (e.g., code "01"), the end code indicating a not end fragment (e.g., "01") and the sequence number set to an incrementally increasing value (e.g., the arbitrary value of the prior fragment+1). The preemption trailer for the last fragment can include the start code indicating a not start fragment (e.g., code "01"), the end code indicating the last fragment (e.g., "10") and the sequence number set to an incrementally increasing value from the prior intermediate fragment. As described above, this disclosure contemplates using any deterministic sequence for the sequence number and should therefore not be limited to incrementally increasing units.

Figure 3:
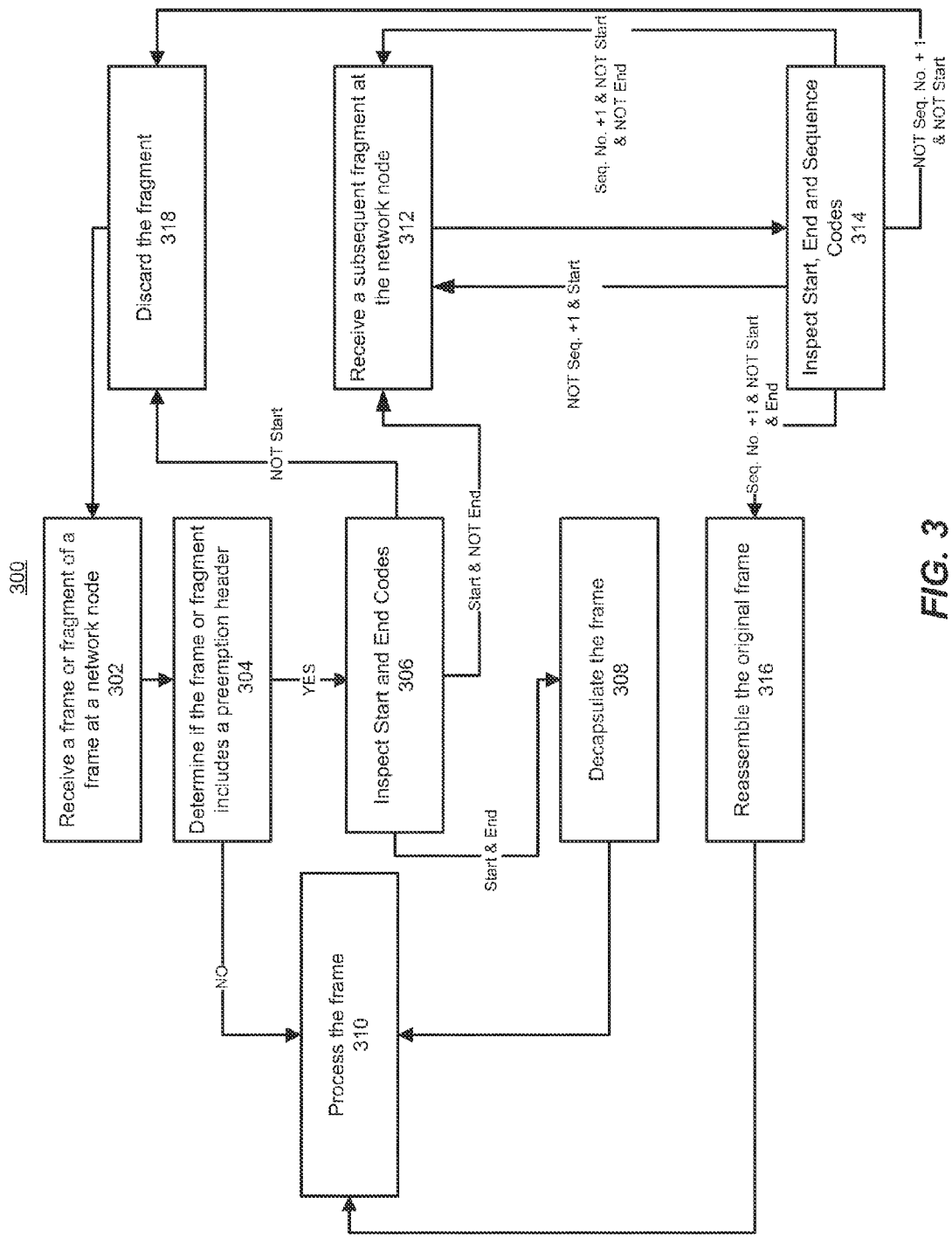
FIG. 3 is a flow diagram illustrating example operations for reception of preemptable network traffic.

Referring now to FIG. 3, a flow diagram illustrating example operations 300 for reception of preemptable network traffic is shown. At 302, a frame (or fragment of a frame) is received at a network node. The network node accepts the frame and verifies CRC and other frame parameters. Then, at 304, the network node determines if the frame or frame fragment includes a preemption header. Preemption headers and preemption trailers are discussed in detail above with regard to FIG. 1. If the frame does not include a preemption header, the network node can process the frame at 310. For example, the network node can optionally perform a table look up and forward the frame to its next hop. If the frame includes a preemption header, the network node can inspect the start and end codes of a preemption trailer at 306.

If the start code indicates a first fragment (e.g., code "10") and the end code indicates a last frame (e.g., code "10"), the frame is not a fragment, and the network node can decapsulate the frame at 308. In FIG. 3, this case is shown as "Start & End." Optionally, the frame with the preemption header and the preemption trailer can be forwarded through the network and only decapsulated at egress to allow cut-through network nodes to identify frames that may or may not be cut-through amongst preemptive traffic. Then, at 310, the network node can process the frame, for example, as discussed above. Alternatively, if the start code indicates that the frame is not a first fragment (e.g., code "01"), the network node can discard the fragment at 318. In FIG. 3, this case is shown as "NOT Start." Optionally, the process can return to step 302 after the fragment is discarded at step 318. Alternatively, if the start code indicates a first fragment (e.g., code "10") and the end code indicates that the frame is not a last frame (e.g., code "01"), the frame is a fragment (e.g., the first fragment). In FIG. 3, this case is shown as "Start & NOT End."

After receiving each fragment, the network node can optionally decapsulate the fragment. Optionally, the preemption header can be forwarded through the network and only decapsulated at egress as discussed above. At 312, the network node can receive a subsequent fragment. At 314, the network node can inspect the start and end codes and the sequence number of each of the subsequent fragments. If the start code indicates that the fragment is not a first fragment (e.g., code "01"), the end code indicates that the fragment is a last fragment (e.g., code "10")and the sequence number is incrementally greater (e.g., by 1) than the sequence number of the previous fragment, the network node has received all of the fragments in the frame, and the network node can reassemble the original frame (e.g., the preempted frame) at 316 from the plurality of fragments. In FIG. 3, this case is shown as "Seq. No.+1 & NOT Start & End." Then, at 310, the network node can process the frame as discussed above. Optionally, the network node can re-assemble the plurality of frame fragments that may have been interrupted by one or more preemptive frames during transmission. If the start code indicates that the fragment is not a first fragment (e.g., code "01"), the end code indicates that the fragment is not a last fragment (e.g., code "01")and the sequence number is incrementally greater (e.g., by 1) than the sequence number of the previous fragment, the process can return to 312 where the network node receives a subsequent fragment because all of the fragments in the original frame (e.g., the preempted frame) have not yet been received. In FIG. 3, this case is shown as "Seq. No.+1 & NOT Start & NOT End." If the start code indicates that the fragment is not a first fragment and the sequence number is not incrementally greater (e.g., by 1) than the sequence number of the previous fragment, the fragment can be discarded at 318. In other words, a fragment is received out of sequence (and it is not a first fragment of a new frame), and the received fragment and optionally all previously stored fragments of the frame can be discarded. In FIG. 3, this case is shown as "NOT Seq. No.+1 & NOT Start." If the start code indicates that the fragment is a first fragment and the sequence number is not incrementally greater (e.g., by 1) than the sequence number of the previous fragment, the process can return to 312 where the network node receives a subsequent fragment of the new frame. In other words, a new first fragment of a frame is received unexpectedly, and the new first fragment of the frame is stored and optionally all previously stored fragments can be discarded. In FIG. 3, this case is shown as "NOT Seq. No.+1 & Start." Optionally, the process can return to step 302 after the fragment is discarded at step 318.

Figure 4:
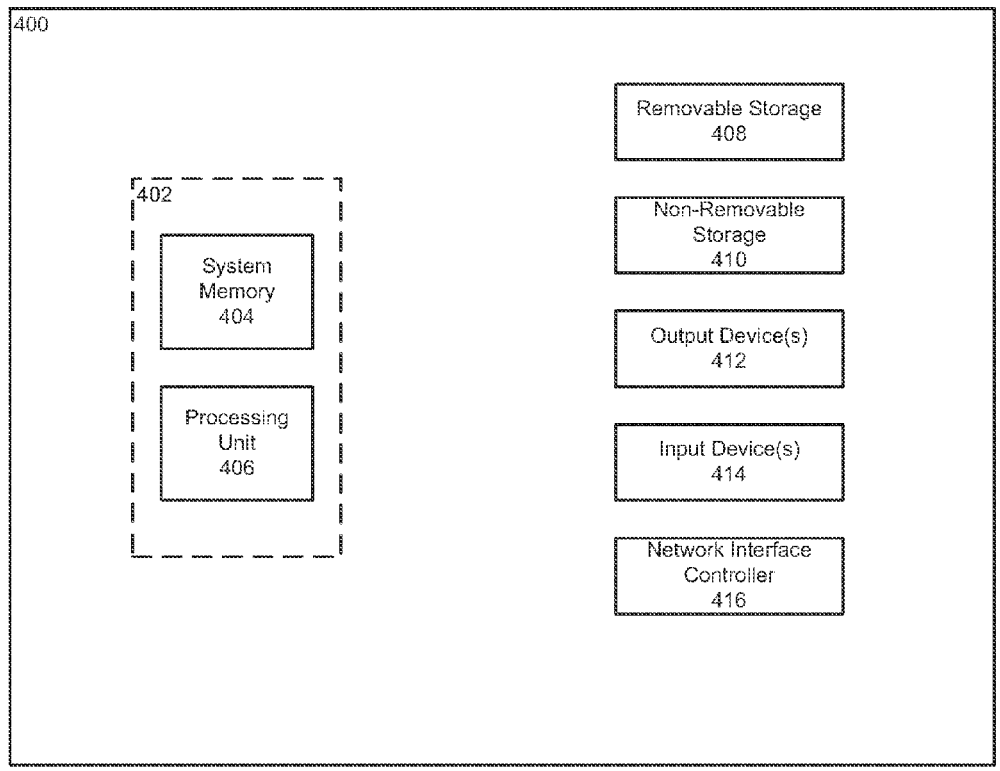
FIG. 4 is a block diagram of an example computing device.

When the logical operations described herein are implemented in software, the process may execute on any type of computing architecture or platform. For example, referring to FIG. 4, an example computing device upon which embodiments of the invention may be implemented is illustrated. In particular, the packet-switching element (e.g., a switch, router, gateway, etc.) discussed above may be a computing device, such as computing device 400 shown in FIG. 4. The computing device 400 may include a bus or other communication mechanism for communicating information among various components of the computing device 400. In its most basic configuration, computing device 400 typically includes at least one processing unit 406 and system memory 404. Depending on the exact configuration and type of computing device, system memory 404 may be volatile (such as random access memory (RAM)), non-volatile (such as read-only memory (ROM), flash memory, etc.), or some combination of the two. This most basic configuration is illustrated in FIG. 4 by dashed line 402. The processing unit 406 can optionally be a standard programmable processor that performs arithmetic and logic operations necessary for operation of the computing device 400. Alternatively, the processing unit 406 can optionally be an application specific integrated circuit ("ASIC") that performs arithmetic and logic operations necessary for operation of the computing device 400.

Computing device 400 may have additional features/functionality. For example, computing device 400 may include additional storage such as removable storage 408 and non-removable storage 410 including, but not limited to, magnetic or optical disks or tapes. Computing device 400 may also contain network connection(s) 416 that allow the device to communicate with other devices. Computing device 400 may also have input device(s) 414 such as a keyboard, mouse, touch screen, etc. Output device(s) 412 such as a display, speakers, printer, etc. may also be included. The additional devices may be connected to the bus in order to facilitate communication of data among the components of the computing device 400. All these devices are well known in the art and need not be discussed at length here.

The processing unit 406 may be configured to execute program code encoded in tangible, computer-readable media. Computer-readable media refers to any media that is capable of providing data that causes the computing device 400 (i.e., a machine) to operate in a particular fashion. Various computer-readable media may be utilized to provide instructions to the processing unit 406 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 406 may execute program code stored in the system memory 404. For example, the bus may carry data to the system memory 404, from which the processing unit 406 receives and executes instructions. The data received by the system memory 404 may optionally be stored on the removable storage 408 or the non-removable storage 410 before or after execution by the processing unit 406.

Computing device 400 typically includes a variety of computer-readable media. Computer-readable media can be any available media that can be accessed by device 400 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program (s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for intermittent encapsulation of preemptable network traffic at a network node, comprising:
   receiving network traffic at the network node;
   determining if a frame within the network traffic is a preemptable frame;
   if the frame is a preemptable frame, determining if the preemptable frame satisfies a selective encapsulation rule, wherein the selective encapsulation rule comprises a scheduled transmission time window;
   if the preemptable frame is transmitted outside of the scheduled transmission time window, transmitting the preemptable frame from the network node without altering the preemptable frame; and
   if the preemptable frame is transmitted within the scheduled transmission time window, encapsulating the preemptable frame by adding data and transmitting the encapsulated preemptable frame from the network node, wherein the added data is at least one of a preemption header or a preemption trailer, and wherein application of the selective encapsulation rule reduces the aggregate encapsulation overhead for the network traffic that is preemptable.

2. The method of claim 1, wherein the preemption trailer comprises at least one of a start code, an end code, or a sequence number.

3. The method of claim 1, further comprising:
   receiving a preempted frame at the network node;
   splitting the preempted frame into a plurality of frame fragments;
   encapsulating each of the frame fragments; and
   transmitting each of the encapsulated frame fragments from the network node, wherein each of the frame fragments is respectively encapsulated with at least one of a preemption header or a preemption trailer, the preemption trailer comprising at least one of a start code, an end code, or a sequence number.

4. The method of claim 3, wherein the preemption trailer of a first frame fragment of the preempted frame comprises the start code representing a first frame and the sequence number.

5. The method of claim 3, wherein the preemption trailer of a last frame fragment of the preempted frame comprises the end code representing a last frame and the sequence number.

6. The method of claim 3, wherein the preemption trailer of an intermediate frame fragment of the preempted frame comprises the sequence number.

7. A non-transitory computer readable medium for intermittent encapsulation of preemptable network traffic having computer-executable instructions stored thereon that, when executed by a network node, cause the network node to:
   receive network traffic;
   determine if a frame within the network traffic is a preemptable frame;
   if the frame is a preemptable frame, determine if the preemptable frame satisfies a selective encapsulation rule, wherein the selective encapsulation rule comprises a scheduled transmission time window;
   if the preemptable frame is transmitted outside of the scheduled transmission time window, transmit the preemptable frame without altering the preemptable frame; and
   if the preemptable frame is transmitted within the scheduled transmission time window, encapsulate the preemptable frame by adding data and transmit the encapsulated preemptable frame, wherein the added data is at least one of a preemption header or a preemption trailer, and wherein application of the selective encapsulation rule reduces the aggregate encapsulation overhead for the network traffic that is preemptable.

8. The non-transitory computer readable medium of claim 7, wherein the preemption trailer comprises at least one of a start code, an end code, or a sequence number.

9. The non-transitory computer readable medium of claim 7, having further computer-executable instructions stored thereon that, when executed by the network node, cause the network node to:
   receive a preempted frame;
   split the preempted frame into a plurality of frame fragments;
   encapsulate each of the frame fragments; and
   transmit each of the encapsulated frame fragments, wherein each of the frame fragments is respectively encapsulated with at least one of a preemption header or a preemption trailer, the preemption trailer comprising at least one of a start code, an end code, or a sequence number.

10. The non-transitory computer readable medium of claim 9, wherein the preemption trailer of a first frame fragment of the preempted frame comprises the start code representing a first frame and the sequence number.

11. The non-transitory computer readable medium of claim 9, wherein the preemption trailer of a last frame fragment of the preempted frame comprises the end code representing a last frame and the sequence number.

12. The non-transitory computer readable medium of claim 9, wherein the preemption trailer of an intermediate frame fragment of the preempted frame comprises the sequence number.

13. A network node for intermittent encapsulation of preemptable network traffic, comprising:
   a processing unit; and
   a memory communicatively connected to the processing unit, the memory having computer-executable instructions stored thereon that, when executed by the processing unit, cause the processing unit to:
   receive network traffic;
   determine if a frame within the network traffic is a preemptable frame;
   if the frame is a preemptable frame, determine if the preemptable frame satisfies a selective encapsulation rule, wherein the selective encapsulation rule comprises a scheduled transmission time window;
   if the preemptable frame is transmitted outside the scheduled transmission time window, transmit the preemptable frame without altering the preemptable frame; and
   if the preemptable frame is transmitted within the scheduled transmission time window, encapsulate the preemptable frame by adding data and transmit the encapsulated preemptable frame, wherein the added data is at least one of a preemption header or a preemption trailer, and wherein application of the selective encapsulation rule reduces the aggregate encapsulation overhead for the network traffic that is preemptable.

14. The network node of claim 13, wherein the memory has further computer-executable instructions stored thereon that, when executed by the processing unit, cause the processing unit to:
   receive a preempted frame;
   split the preempted frame into a plurality of frame fragments;
   encapsulate each of the frame fragments; and
   transmit each of the encapsulated frame fragments, wherein each of the frame fragments is respectively encapsulated with at least one of a preemption header or a preemption trailer, the preemption trailer comprising at least one of a start code, an end code, or a sequence number.

* * * * *